(12) United States Patent
Scherling

(10) Patent No.: US 7,554,597 B2
(45) Date of Patent: Jun. 30, 2009

(54) OPTICAL IMAGE RECORDING SYSTEM, AND ASSOCIATED PROCESSING SYSTEM

(75) Inventor: Herman Scherling, Naerum (DK)

(73) Assignee: Sony Corporation, Tokyo (JP)

( * ) Notice: Subject to any disclaimer, the term of this patent is extended or adjusted under 35 U.S.C. 154(b) by 1169 days.

(21) Appl. No.: 10/706,710

(22) Filed: Nov. 12, 2003

(65) Prior Publication Data

US 2004/0105025 A1    Jun. 3, 2004

Related U.S. Application Data

(63) Continuation of application No. 09/213,434, filed on Dec. 17, 1998, now Pat. No. 6,850,279.

(30) Foreign Application Priority Data

Jun. 18, 1996  (DK) ..................................... 0676/96
Jun. 17, 1997  (WO) ..................... PCT/DK97/00261

(51) Int. Cl.
*H04N 5/225*  (2006.01)
*G02B 13/16*  (2006.01)

(52) U.S. Cl. ..................... 348/335; 348/340; 348/373
(58) Field of Classification Search ................ 348/335, 348/340, 374, 373, 207.1, 207.11
See application file for complete search history.

(56) References Cited

U.S. PATENT DOCUMENTS

| | | | |
|---|---|---|---|
| 4,114,171 A | | 9/1978 | Altman |
| 5,365,268 A | | 11/1994 | Minami |
| 5,448,319 A | | 9/1995 | Uzawa |
| 6,018,416 A | * | 1/2000 | Mihara ........................ 359/423 |
| 6,498,624 B1 | * | 12/2002 | Ogura et al. ................. 348/335 |
| 6,850,279 B1 | * | 2/2005 | Scherling ..................... 348/335 |

FOREIGN PATENT DOCUMENTS

| | | |
|---|---|---|
| DE | 2136708 | 1/1972 |
| DE | 2553395 | 8/1975 |
| DE | 3214544 | 11/1982 |
| DE | 3409791 | 9/1984 |
| DE | 3930448 | 3/1990 |

(Continued)

*Primary Examiner*—Justin P Misleh
(74) *Attorney, Agent, or Firm*—Frommer Lawrence & Haug LLP; William S. Frommer; Thomas F. Presson

(57) ABSTRACT

An optical image recording system for electronic recording of optical information comprising a lens system and a body The body having a configuration with a low height and with broad surfaces through one of which surfaces said optical information is being received, and accommodating an image recording device having a light sensitive area. The lens system includes a front lens group having a first optical axis, a back lens group consisting of one or more lenses having a second optical axis and a reflective element folding the first optical axis into the second optical axis in an angle of less than 180 degrees. The lens system is accommodated in the body; and an optical image recording and processing system for the recording and processing of electrical signals of optical information and other information.

38 Claims, 13 Drawing Sheets

FOREIGN PATENT DOCUMENTS

| | | |
|---|---|---|
| DE | 4211824 | 10/1992 |
| DE | 2659729 | 10/1997 |
| EP | 0 669 751 A2 | 8/1995 |
| EP | 676663 | 10/1995 |
| EP | 701364 | 3/1996 |
| FI | 21613 | 10/1946 |
| JP | A63-199312 | 8/1988 |
| JP | A1-176168 | 7/1989 |
| JP | 8-130702 | 11/1994 |

* cited by examiner

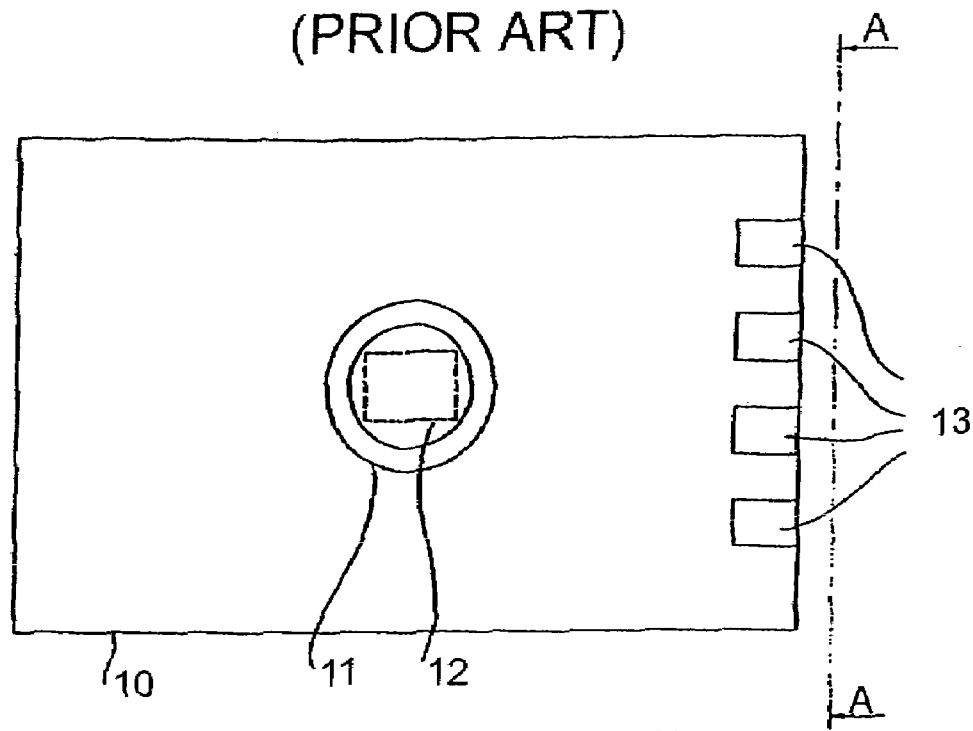
FIG. 1A
(PRIOR ART)
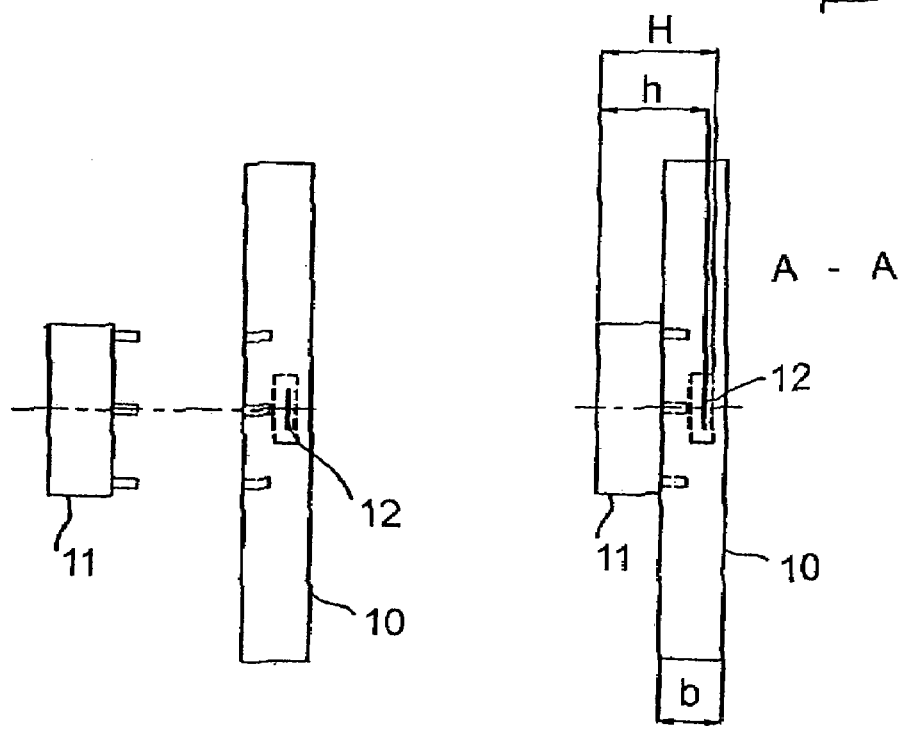
FIG. 1C
(PRIOR ART)
FIG. 1B
(PRIOR ART)

FIG. 2A
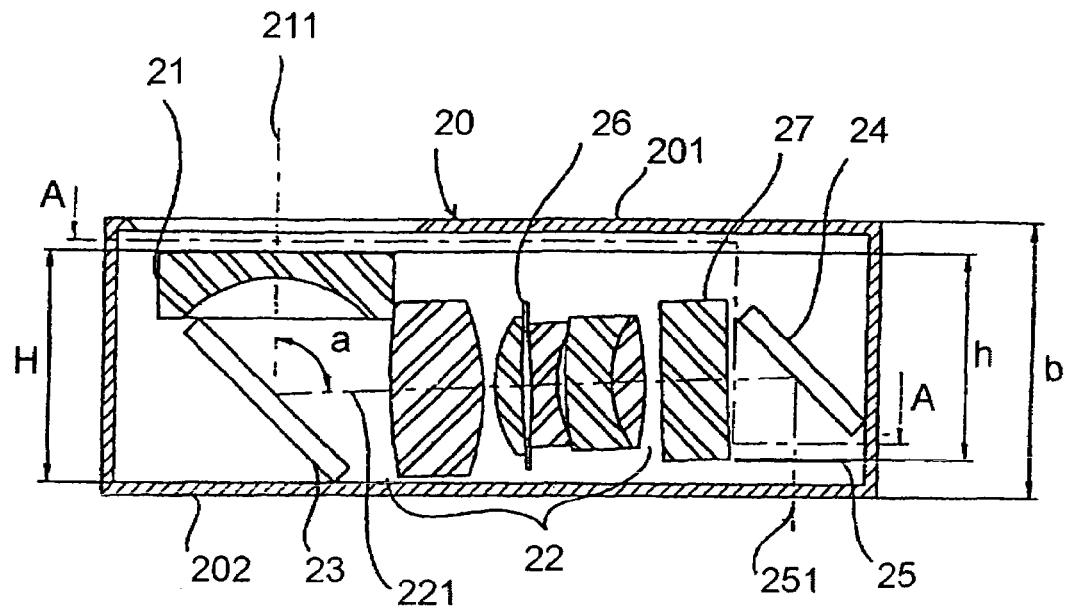
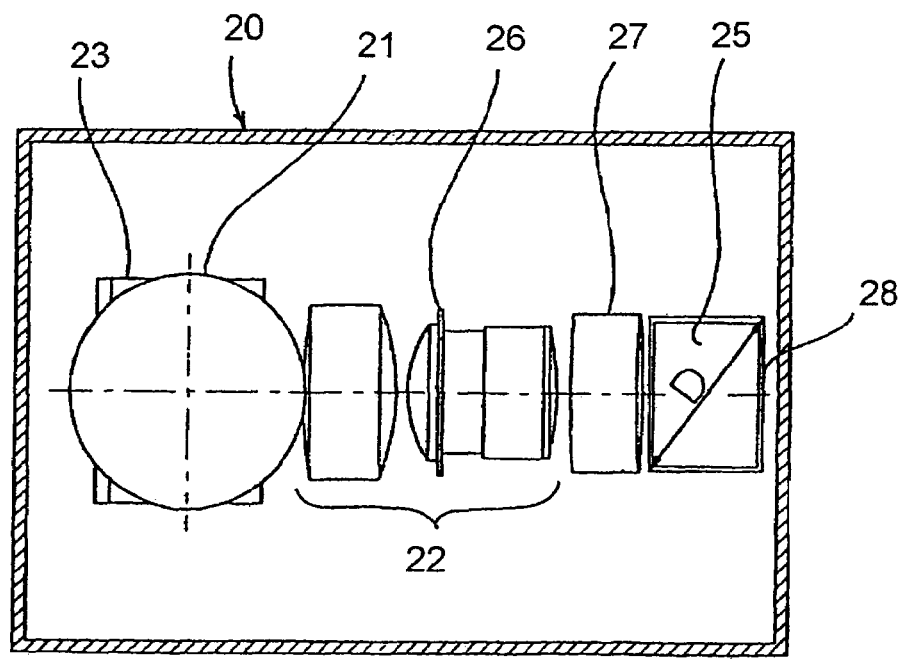
A - A
FIG. 2B

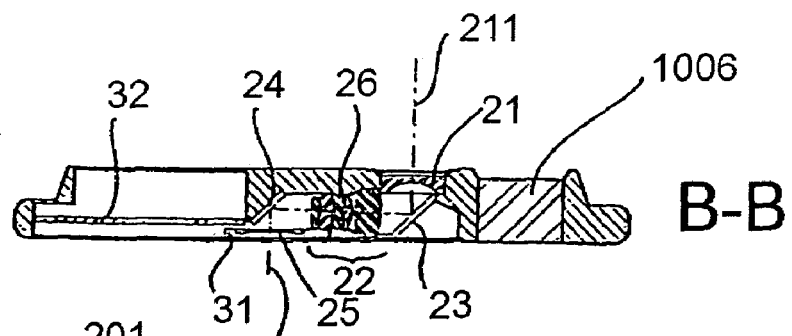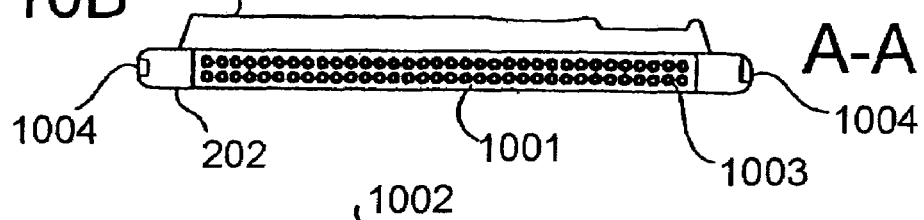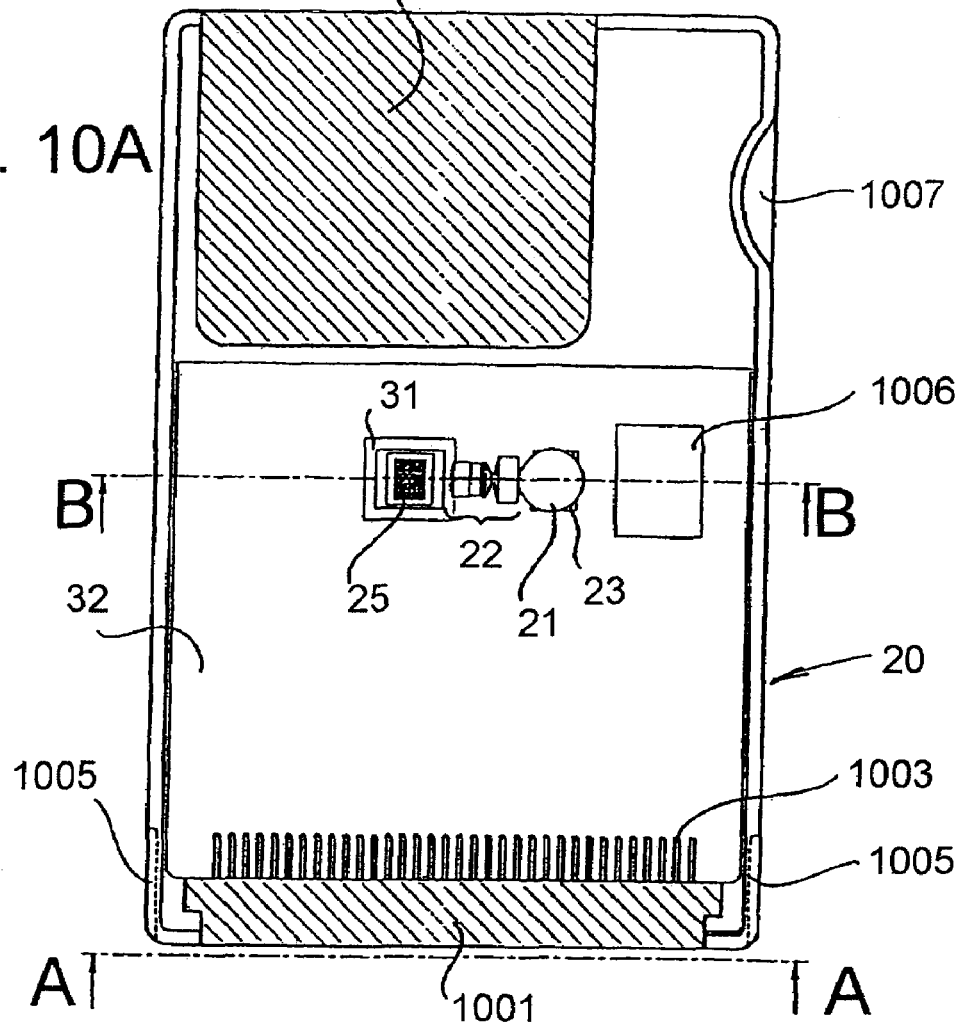

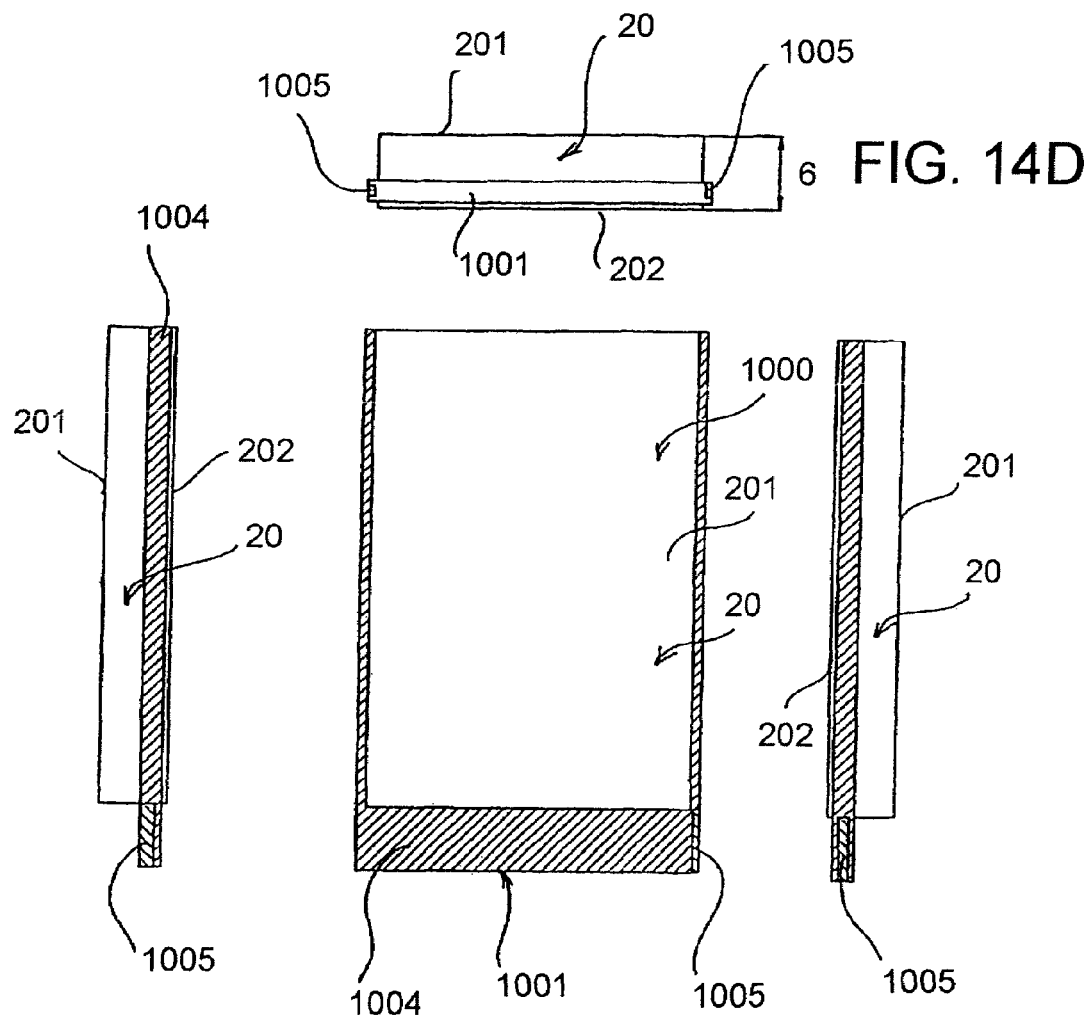

OPTICAL IMAGE RECORDING SYSTEM, AND ASSOCIATED PROCESSING SYSTEM

CROSS REFERENCE TO RELATED APPLICATIONS

This is a continuation of U.S. patent application Ser. No. 09/213,434, now U.S. Pat. No. 6,850,279, filed Dec. 17, 1998.

BACKGROUND OF THE INVENTION

The present invention relates to an optical image recording system and an associated processing system.

The Technical Field

Optical image recording systems such as conventional cameras and electronic cameras are available in many different designs and sizes.

Portable cameras are usually miniaturized for the purpose of being portable in a bag or pocket. A general problem of such portable cameras is that their sizes and shapes make them unpractical and unhandy to carry along as can be done with personal equipment of sizes such as a credit card or drivers licence.

Electronic cameras are also available in different designs for various applications such as built-in cameras in permanent installations or as portable cameras. Such electronic cameras are usually designed on one or more printed circuit boards (PCB) for which a minimum dimension in the two directions of the plane is required. The height of the camera is usually dependent on the dimensions of the lens system used, and it is totally dependant on the focal length thereof.

A disadvantage of these image recording systems is that they are difficult to miniaturize.

Prior art lens systems for such cameras are often miniaturized by the use of a limited number of lenses so that the effective lens height thereof can be brought down to approximately 1 times the focal length of the lens system.

A consequence of using only a few, typically only one lens, is that the formed image has an unsatisfactory resolution and performance. Therefore, in order to achieve a reasonable resolution, it is necessary to reduce the aperture whereby, however, the photosensitivity is reduced.

Further, if a low height is to be maintained, only a short focal length—and consequently a wide angle field of view—can be used. Any increase in the focal length of the lens will lead to an increase of the height.

Especially for electronic cameras a further disadvantage is that the transfer of the recorded optical information requires the use of cumbersome external cables connecting the camera and image processing system, or it requires an exchangeable memory such as a diskette or a solid state memory. For the latter two data carriers, the cumbersome cables can be avoided, but they will require the software for controlling the image processing system to be loaded on the data carrier which requires space thereon.

Prior Art

JP 01-176 168 discloses a compact electronic still camera comprising a camera main body in form of a plastic resin card having a thickness within 10 mm. The card camera comprises a CCD 2-dimensional image sensor and a semiconductor memory for electronic recording of an image, and a connector for the connection of the circuit inside the card camera with the circuit of an image reproducing device for transferring the still picture information thereto. The camera is provided with a demountable lens to be removed when the card camera must be flat.

DE 26 59 729 discloses a single lens reflex pocket camera having a twice 90 degrees broken optical axis to accommodate a built in zoom lens. The camera receives the optical information through a side of the camera body. Such a system has the disadvantage that when the body height is low, the viewfinder is not properly framed, i.e. it is difficult to look through it and see the object. For a camera with a very low body height, it is impossible to look through the viewfinder. Furthermore, a down scaling of the disclosed optical system requires very small and thin lenses which are very difficult to manufacture within small tolerances with present technology and which are impractical to handle. For an image recording system that should be mounted flat on a wall, e.g. as part of a door phone, it cannot be allowed that the optical information is received through a side of the camera body.

DE 25 53 395 discloses an endoscope objective comprising an inverted telephoto objective connected to a waveguide. The endoscope neither comprises a body having a configuration with a low height and with broad surfaces, nor does it comprise an optical image recording system with image recording device, viewfinder, and a solid state memory. The endoscope objective cannot be accommodated in the body of an image recording system having an S-ratio less than 1.9, i.e. having a large diagonal of the image recording device as compared to the height of the body of the image recording system, nor can a high resolution image recording system based on the endoscope objective be incorporated in such a body having a size to be kept in a wallet or in the form of a type II PCMCIA card.

JP 63-199 312 discloses an electronic camera intended for small image sizes and short focal lengths. The camera uses a non-folded lens system having a long back focus allowing space for a blur filter to be incorporated therein. Very thin lenses are required, which is not desirable from a practical point of view as the lenses become very vulnerable and sensitive to variations in lens thickness. It is impossible to effectively minimize the effective lens height. Hence, a very compact high resolution camera cannot be made.

EP 0 676 663 discloses a compact camera which is suitable for use as hidden or candid camera. The lens section is fabricated to minimize the thickness of the camera. In an embodiment, the camera includes a plane body having a pinhole disposed therein and a lens disposed on the plane body. Only short focal lengths can be accepted in order to maintain a flat body. The lens is a single element aspherical lens which results in a low resolution and limited speed which is not acceptable for high resolution applications. Furthermore, the back focus is too short to provide enough space for colour filters comprising multiple birefringent plates to be inserted between the lens and the CCD. Hence, for high resolution applications aliasing might occur.

DISCLOSURE OF THE INVENTION

Optical Image Recording System

In a first aspect of the present invention, it is the object to provide an optical image recording system for the recording of optical information which system can be accommodated in a compact, flat configuration; particularly in a compact, flat camera which can be kept in a wallet or a small handbag designed for carrying credit cards.

It is a further object of the present invention to provide such an optical image recording system for which the speed and resolution of the optical information is substantially maintained as compared to prior art miniature, compact multiple lens systems.

It is another object of the present invention to provide such an optical image recording system which can comprise a birefringent blur filter, preferably a filter incorporating more than one birefringent quartz plate.

It is still another object of the present invention to provide such an image recording system which is less sensitive to variations in lens thickness.

According to the invention, these objects are fulfilled by providing an optical image recording system for electronic recording of optical information comprising a lens system and a body; said body having a configuration with a low height and with broad surfaces through one of which surfaces said optical information is being received, and accommodating an image recording device having a light sensitive area; which system is characterized in that the lens system comprises: a front lens group having a first optical axis; a back lens group consisting of one or more lenses having a second optical axis; and a reflective element folding the first optical axis into the second optical axis in an angle a of less than 180 degrees; and that said lens system is accommodated in said body whereby it is ensured that the optical image recording system achieves a compact, flat configuration.

Particularly, the optical image recording system can be embodied in a compact, flat camera which can be kept in a wallet or a small handbag designed for carrying credit cards. Such a camera has the advantage compared to prior art cameras, e.g. card type cameras, that the lens system does not have to be removed from the body before being inserted into such a wallet or handbag.

It is a further advantage that the focal length of the lens system can be long. Contrary to this, the focal length of the prior art techniques has to be short in order to allow for a short objective which does not protrude too far from the body surface.

Also, it is an advantage that the lens system can comprise optical filters, e.g. blur filters, particularly for high resolution electronic cameras.

The Lens System

According to the invention, the lens system comprises a front lens group having a first optical axis; a back lens group consisting of one or more lenses having a second optical axis; and a reflective element folding the first optical axis into the second optical axis in an angle a of less than 180 degrees, whereby it is obtained that the lens system can be accommodated inside the body so that the effective lens height can be kept smaller than that for non-folded lens systems of the prior art compact, flat cameras.

Further, it is achieved that the optical information received through one of said broad surfaces of the body is received by the lens system and transferred to the image recording device while maintaining speed and resolution.

The front lens group and the back lens group can be negative and/or positive, respectively.

In a preferred embodiment, the front lens group is negative and the back lens group is positive whereby an inverted telephoto lens can be realized.

In another preferred embodiment, the front lens group is positive and the back lens group is negative whereby a telephoto lens can be realized.

Front Lens Group

The front lens group may consist of one or more lenses.

Also, in a special case of a small field angle of view and a focal length long enough for the reflective element to receive the extreme rays entering the system, the lens group may consist of a window.

The front lens group can be designed as known to a person skilled in the art. The desired field angle of view is the determining factor for the shape and complexity of the front lens group. For a wide angle field of view, the front lens group is negative and together with the back lens group it forms an inverted telephoto lens system. Such a system has the advantage that it can be designed to allow space between the front lens group and the back lens group for a reflective element. For a particularly flat design of the body, the diameter of the last surface in the front lens group should be minimized, thereby allowing the size of the reflective element to be minimized. For wide and medium angle fields of view, the diameter and complexity of the front lens group can be reduced by reducing the field angle of view.

A reduction of the field angle of view allows the number of lenses in the front lens group to be reduced because a smaller field of view exhibits less aberrations whereby the lens height can be further reduced.

Also, a reduction of the speed of the lens system and/or an increase of the focal length, allow the diameter of the first lens group to be reduced and thereby allow a reduction of the lens height.

In a particular embodiment the front lens group is made strongly refractive, thereby allowing a small diameter of the last surface of the front lens group and a small size of the reflective element. This, however, introduces a large geometric distortion which is not desired for a high quality lens system. However, by using a solid state image sensor as the image recording device, the geometric distortion of the system can be electronically corrected. The front lens group may comprise a gradient index (GRIN) lens, particularly a radical gradient index lens whereby the lens height can be reduced or a higher quality image can be obtained.

Aspherical lenses can be used as well.

The front lens group may be positive or negative. In a preferred embodiment, the front lens group consists of a single negative lens.

Back Lens Group

According to the invention, the lens system comprises a back lens group consisting of one or more lenses having a second optical axis; said lens or lenses bending the incoming light by refraction, diffraction or a combination thereof whereby it is obtained that the optical information reflected by the reflective element is formed into an image.

The number of lenses and their designs are chosen so that a sharp image can be formed for a lens system with a desired field angle of view, lens speed and image quality. Especially for wide angles of view and high lens speed, it is preferred to use a multiple element back lens-group whereby a sharp image can be obtained.

In an embodiment, the multiple back lens group consists of four lenses, one of which is an achromate, and an aperture stop. The other lenses are a condenser, a meniscus lens and a concave lens.

Suitable back lens groups forming sharp images can be designed by a skilled person by using other lenses and other combinations thereof, and they may be designed to include other functions e.g. a zoom.

The lenses are made of suitable materials that permit light of the desired wavelengths to pass through. Wavelengths are generally in the visible range of the electromagnetic spectrum, but wavelengths e.g. in the infrared region are included. Suitable materials are known to a skilled person. These materials comprise light transmissable materials of glass, plastic, liquids. Glass or plastic of optical grade are preferred.

Particularly, axial gradient index (GRIN) lenses may be used whereby a simplified construction or a higher quality image can be obtained.

One or more of the lenses can comprise a diffractive optical element whereby the back lens group can be even further simplified, the speed can be increased or a higher image quality can be obtained.

Aspherical lenses can be used as well.

Correction of the various lens aberrations: spherical, coma, astigmatism, curvature of field and distortion can be done as for normal lenses and objectives with the advantage that thick lenses, especially axial gradient index lenses, and numerous lenses can be used without or almost without increasing the effective lens height. Such an increase of the effective lens height depends on the folding angle between the front lens group and the back lens group.

The back lens group may include one or more filters.

Reflective Element

According to the invention, the lens system comprises a reflective element folding the first optical axis into the second optical axis in an angle a of less than 180 degrees whereby it is obtained that the optical information (luminous flux) received by the front lens group is transformed to the back lens group so that an image can be formed on the image recording device.

The reflective element can be any suitable reflective element known to the skilled person, e.g. a prism or a mirror.

In a preferred embodiment, the reflective element consists of a flat first surface mirror whereby the luminous flux is reflected without having to pass through a substrate.

The substrate for the flat first surface mirror should be chosen so that it performs well with the reflective surface. It can be a rigid material such as glass, particularly float glass, but other materials such as plastic or metals such as aluminium can be used. In a particular embodiment, the reflective element consists of an aluminium substrate having a polished reflective surface.

In a preferred embodiment, the front lens group and the reflective element consist of a prism.

Additional Reflective Element

In another preferred embodiment, the lens system comprises an additional reflective element folding the second optical axis into the optical axis of the image recording device whereby a particular compact configuration of the lens system can be obtained.

The additional reflective element can be chosen as mentioned for the first reflective element.

In a preferred embodiment, the additional reflective element consists of a prism.

Aperture Stop

The aperture stop of the lens system can be designed in any suitable way known to the skilled person. It is preferred that the aperture stop is determined by a stop placed after the first reflective element, particularly placed in the back lens group.

Folding and Orientations of Optical Axes

According to the invention, the lens system is a folded lens system having the reflective element fold the first optical axis into the second optical axis in an angle a of less than 180 degrees whereby it is obtained that the lens system can be kept compact, particularly much more compact than that for non-folded lens systems of the prior art.

It is further obtained that relatively thick lenses can be used, especially in the back lens group whereby lenses of relatively non-fragile dimensions can be used, e.g. gradient index lenses (GRIN lenses), particularly axial GRIN lenses. Such lenses are available from Lightpath Technologies, Tuscon, Ariz., U.S.A.

Also, it is obtained that the back lens group may consist of several lenses whereby it is obtained that a better control of aberrations can be achieved compared to a back lens group consisting of few lenses. This is important when designing a high speed lens system, typically a lens system with a front lens group having a large diameter.

In a preferred embodiment, the first optical axis and the second optical axis form an angle equal to or less than 90 degrees whereby a particularly compact lens system can be obtained.

Also, in still another preferred embodiment, the second optical axis and the optical axis of the image recording device form an angle equal to or less than 90 degrees whereby a still more compact lens system can be obtained depending on the extent of the image recording device. If the image recording device is large, which is often the case, a more compact system is obtained.

The orientations of the optical axis can be designed for any suitable purposes. In a preferred embodiment, the first optical axis and the optical axis of the image recording device are substantially in the same plane.

Further, it is preferred that the first optical axis and the optical axis of the image recording device are substantially parallel.

S-Ratio

A particularly preferred lens system has a ratio S of the optical system height H divided by the diameter D of the circumferential circle of the formed image less than 4, preferably equal to or less than 2.55, more preferred equal to or less than 1.7, most preferred equal to or less than 1.2; said optical system height H being the maximum projected distance on the first optical axis from any part of the optical system including lenses, filters, aperture stop, image recording device, and the body thereof.

As it can be seen from the expression, a small S-ratio will provide a compact optical system.

A particularly preferred optical system has a ratio S of 2.55 or less, whereby it is obtained that the lens system can form an image of a size appropriate for e.g. a high resolution ¼" CCD and the entire optical system can be accommodated in the body of the image recording system having a height b that conforms with the PCMCIA type III standard.

For a "heavy duty" embodiment with increased wall thickness and a larger paraxial image height for easier alignment, a ratio S of 2.1 or less is preferred. Another preferred optical system has a ratio S of 1.7 or less, whereby it is obtained that the high resolution optical system utilizing a ¼" image recording device, e.g. a CCD, can be accommodated in the body of the image recording system having a height b of about 7 mm, which is desirable for keeping the image recording system in e.g. a wallet or a small bag for carrying credit cards.

Still another preferred optical system has a ratio S of 1.2 or less, whereby it is obtained that the high resolution optical system utilizing a ¼" image recording device, e.g. a CCD, can be accommodated in the body of the image recording system having a height b that conforms with the PCMCIA type II standard.

For a "heavy duty" embodiment with a better protection of the front lens, an S-ratio of 1 or less is preferred.

The S-ratio is not limited to the applications as pointed out here. Where appropriate systems can be designed with an S-ratio suitable for the application in question.

Height-ratio

It is particularly preferred that the height ratio of the effective lens height h and the effective focal length f of the lens system are less than 1.7, preferably less than 1.5, whereby particularly compact, flat configurations as compared to prior art high resolution lens systems can be obtained.

Receiving Optical Information Through a Broad Surface

According to the invention, the lens system receives the optical information through one of the broad surfaces of the body of the optical image recording system whereby it is obtained that the viewfinder is properly framed, i.e. it is easy to look through the viewfinder and see only the object to be imaged. As the height of the body can be very low, it is not appropriate to receive the optical information through a side of the body.

For a system receiving the optical information from the side, stable placement of the viewfinder in front of the eye would be difficult to achieve. Furthermore, for such a system, the viewfinder will take up a lot of space.

Contrary to such a system, the optical image recording system according to the present invention will be very easy to hold still and to operate. No parts of it protrude from the user and it can be kept steady in one or two hands thereby allowing operation thereof in an ergonomically correct manner. For wall-mounted flat image recording systems, it is a must that the optical information is received through a broad surface.

Image Recording Device

According to the invention, the body accommodates an image recording device having a light sensitive area. Image recording devices may consist of any suitable device which is able to record the optical information formed into an image by the lens system in the form of a signal which can be processed in an image processing system.

It is preferred that the image recording device is a photo-sensitive electrical device, particularly a solid state image sensor such as a charge coupled device (CCD), a metallic oxide semiconductor (MOS), or similar.

When a solid state image sensor is used, the geometric distortion of the lens system can be electronically corrected whereby a large geometric distortion of the lens system can be allowed. This has the advantage that the front lens group can be made strongly refractive whereby the diameter of the last surface of the front lens group and the size of the first reflective element can be minimized, and consequently the height of the lens system can be reduced.

The aspect ratio of the image recording device can be chosen within wide limits provided the radius of the active field of the image recording device measured from the optical axis is within the real image height of the lens system. If the radius is larger, there will be "dead" pixels not being exposed to the formed image. Normally, an aspect ratio of 4/3 is used for a solid state image sensor, but an aspect ratio of e.g. 16/9 can also be used.

Optical Filter

The lens system may further comprise one or more optical filters which, according to the long back focus and folded lens system of the invention, can be incorporated in the body without increasing the effective lens height.

In a preferred embodiment, the lens system comprises an anti-aliasing filter inserted between the last lens in the back lens group and the image recording device.

It is preferred that the anti-aliasing filter is a blur filter placed between the back lens group and the image recording device whereby aliasing caused by the image recording device, e.g. a CCD, having a colour filter array on its surface and objects having a high degree of details can be reduced.

The blur filter can be made as known in the art. It can consist of one or more birefringent crystalline quartz plates having typically large thicknesses compared to the focal length of the optical system. Its design depends on the structure of the pixels and the colour filter array of the image recording device.

It is preferred that the filter has an optical axis parallel with the second optical axis of the optical system whereby it is obtained that the effective lens height can be kept small even if the filter is thick compared to the focal length.

The filters may be placed in any suitable position. In a preferred embodiment, e.g. in the form of an electronic camera as described above, the filter is placed between the lens system and the image recording device.

The filter can be several millimeters thick. However, if the filter is thick and positioned after the additional reflective element, it can necessitate a large effective lens height.

If the filter is relatively thin e.g. consists of only few elements, or if the back focus is very long, it is obtained that an additional reflective element can be inserted after the back lens group, preferably after the filter. Hereby it is further obtained that the second optical axis can be folded into the optical axis of the image recording device whereby image recording devices in standard housing can be used and they can be mounted directly onto e.g. a printed circuit board.

The blur filter can be combined with an IR-blocking filter or other filters or combinations thereof.

For optical image recording systems where a blur filter is not needed, e.g. an optical image recording system with a fixed aperture stop and a colour filter array pattern allowing rotational symmetric blurs generated by a defocusing of the lens system, the optical filter can consist of one or more evaporated filters whereby it is obtained that only very little space is required in order to accommodate the filter.

In this case the optical filter can be evaporated on a lens surface taking due care that the spectral characteristics of the filter vary with the angle of incidence. To reduce this effect, it is preferred that the filter is placed so that the principal rays are normal to the filter surface. In a preferred embodiment, an evaporated filter is applied to the concave surface of the first lens.

When a birefringent blur filter is used it is necessary to correct the aberrations introduced by the filter. These corrections are known to the skilled person.

Body

According to the invention, the body can be any suitable body having a configuration with low height and with broad surfaces through one of which surfaces the optical information is being received, which body can accommodate the optical image recording system, and which body can protect the optical image recording system both mechanically and optically from the outside.

In a suitable embodiment, the body consists of a rigid construction with a thin wall of suitable material such as moulded plastic, die casted light metal alloy or formed metal plate. The wall can also be of a composite material such as carbon fibre reinforced plastic resin whereby a particularly preferred light and mechanically strong body is achieved.

Further, in order to protect the optical image recording system from electro-static discharge and to ensure electromagnetic compatibility, the body can be made of or can include a conductive material such as e.g. carbon fibres.

Generally, the height of the body is less than 20 mm whereby it is obtained that the body has a sufficiently flat configuration for accommodation into slots of most commonly used dimensions in image processing systems.

In a particularly preferred embodiment, the height is less than or equal to 10.5 mm whereby the body height conforms with the PCMCIA TYPE III standard.

Most preferably the height is less than or equal to 5.0 mm, whereby the body height conforms with the PCMCIA TYPE II standard.

For insertion into a wallet, a height of max 7 mm is desired.

Storing, Transferring and Receiving Electronic Signals

The body of the optical image recording system may further comprise various accessories for focussing, white balance control, automatic gain control, etc. It may also contain a power supply, e.g. a battery.

In a preferred embodiment, the body further comprises means for storing electronic signals of control information for controlling the operation of the external device.

In a particular embodiment, it is preferred that the body comprises means for loading the control information into the external device whereby it is obtained that the operation of the external device, e.g. an image processing system not preset to process the optical images of the optical image recording system, can be controlled by the specific control information loaded into the external device.

Control information includes system operation software such as software for control of the image processing system and software for image processing.

Transmission of the electronic signals may be carried out in any suitable way known to the skilled person such as either by direct connection of the electric circuits of the optical image recording system with that of the processing system, or by wireless transmission/reception.

When direct connection is applied, it is preferred that the guidance of the connection be controlled. Therefore, in a preferred embodiment, the body further comprises guiding means for its guidance in a slot, groove or the like.

It is not necessary that the body is inserted into the image proccesing system. In an embodiment, a display screen is connected onto the body of the optical image recording system. This connection may be permanent or not, and the display screen may be integrally connected to the body.

Particularly, the embodiment of wireless transmission/reception has the advantage of avoiding safety measures to ensure the guidance of the connection of the optical image recording system and the processing system.

In a preferred embodiment, the means for transferring electronic signals comprises a wireless transmitter of analogue and/or digital transmission.

Also, the means for receiving electronic signals comprise a wireless receiver of analogue and/or digital transmission.

Wireless transmitter and receiver can be any such suitable devices known to the skilled person, e.g. radio transmitter/receiver or optical transmitter/receiver.

Optical Image Recording and Processing System

In another aspect, it is the object of the present invention to provide an optical image recording and processing system for which optical information can easily be tranferred from the optical image recording system to an associated processing system.

This object is fulfilled according to the invention by providing an optical image recording and processing system for the recording and processing of electrical signals of optical information and other information; said system comprising means for transferring and receiving elec-tronic signals consisting of a pair of connector devices having a databus interface, wherein one connector device of said pair of connector devices is accommodated in the optical image recording system for direct connection to the other of said pair of connector devices accommodated in the image processing system.

In a preferred embodiment, the connector device of the optical image recording system is accommodated in the end face thereof whereby a particularly simple, connection with multiple connections can be established and a parallel databus for fast communication can be provided. Furthermore, the connector device is well protected against mechanical stress and it provides a good protection against electrostatic discharge (ESD)

In a preferred embodiment, the image processing system accommodates the connector device in a slot whereby in a simple and safe way the accommodation and connection of the optical image recording system is ensured without having to use a cumbersome cable. The optical image recording system can be partly or fully inserted in the slot thereby ensuring that sensitive parts, e.g. the lens system, are protected against mechanical effects during connection with the image processing system.

Also, in a preferred embodiment, the optical image recording system and the slot of the processing system comprise guiding means for guiding their mutual connection whereby a safe connection is ensured.

Particularly, it is preferred that the optical image recording and processing system comprises an optical image recording system according to the invention.

Suitable image processing systems are known in the art. They include computers such as personal computers and lab top computers; telephones, mobile phones, and satellite phones; fax machines; printers; display screens, and video tape units, but are not limited thereto.

BRIEF DESCRIPTION OF THE DRAWINGS

FIGS. 1A, 1B, and 1C show an optical image recording system according to prior art;

FIGS. 2A, 2B, 3A, 3B, 4, and 5 show cross-sectional views and a top view of preferred optical image recording systems according to the present invention;

FIGS. 10A, 10B, and 10C show three views of a preferred embodiment of an image recording system according to the present invention;

FIGS. 14A, 14B, 14C, and 14D show a preferred embodiment of the means of guidance of the image recording system according to the present invention.

DETAILED DESCRIPTION

Prior Art

Figure 3A:
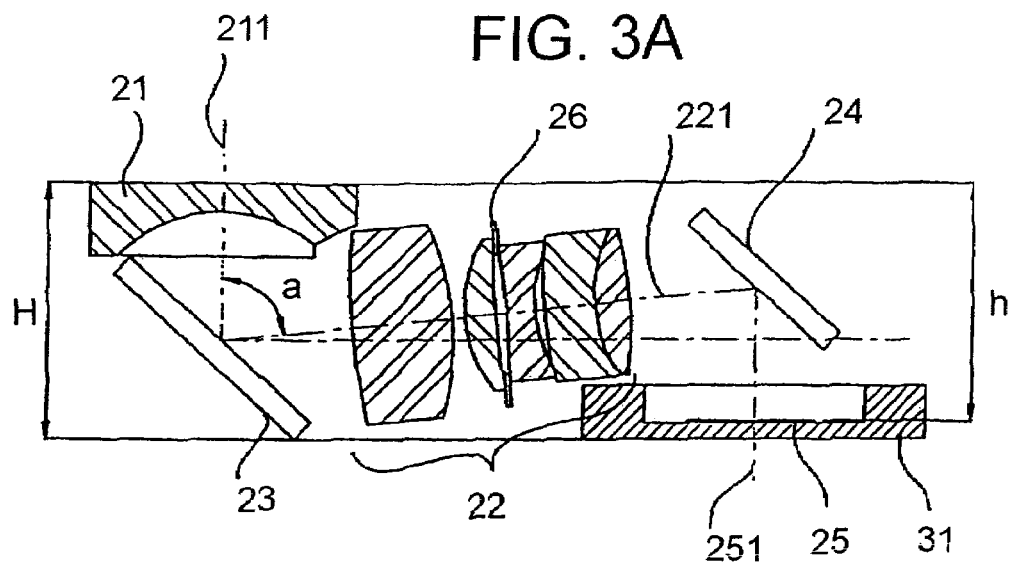

FIG. 1A shows a schematic top view of a broad surface of an optical image recording system according to prior art. The image recording system includes a flat body 10 with broad surfaces; a lens system 11, said lens system being demountable as illustrated in FIGS. 1B and 1C showing end views from the line A-A; a two-dimensional image recording device 12; and a connector device 13.

The optical information is received by and transformed into an image by the lens system 11. The two-dimensional image recording device 12 transforms the optical information into electrical information that can be processed and stored in a semiconductor memory.

From the semiconductor memory the electrical information can be transferred to an image processing system through the connector device 13.

In FIG. 1B, the effective lens height h, the optical system height H, and the body height b are shown.

In order to make the entire image recording system have a flat configuration, it is necessary to demount the lens system 11 as illustrated in FIG. 1C.

Preferred Embodiment According to the Invention

FIG. 2A shows a cross-sectional view and FIG. 2B shows a top view of a preferred embodiment of an optical image recording system according to the present invention. It comprises a lens system comprising a front lens group 21; a back lens group 22; a reflective element 23; an additional reflective element 24; an aperture stop 26; and an optional filter 27. The optical image 28, having a circumferential circle of a diameter D, is formed by the lens system and transformed into electrical signals by the image recording device 25.

The optical image recording system further comprises a body 20 with broad surfaces 201 and 202 and a low height b, said body housing the lens system and the image recording device.

Contrary to FIG. 1, prior art, the lens system is accommodated in the body 20, whereby the optical image recording system at all times has a low height b and a robust structure. The optical system height H as well as the effective lens height h is smaller than the body height b.

The optical information is received through the front lens group 21 having the optical axis 211 and is then reflected by the reflective element 23 in an angle a into the optical axis 221 of the back lens group 22. The additional reflective element 24 reflects the unfocused image onto the light sensitive surface of the image recording device 25 having an optical axis 251.

In the preferred embodiment, the semifield angle of view is 33 degrees—a relatively wide field. In order to provide enough space for the reflective element 23 between the front lens group 21 and the back lens group 22, an inverted telephoto principle is chosen. The inverted telephoto principle further has the advantage that it provides a good standard of uniformity of image illumination and definition. Also, it provides space for optical filters.

The front lens group 21 is made out of one lens only, said lens being strongly dispersive. By having only one lens in the front lens group 21 and by letting said lens being strongly dispersive, the height of the front lens group and diameter of the last surface of the front lens group 21 is minized. Thereby, the height of the reflective element 23 is minimized and consequently the height H of the optical system and the height b of the body 20 is minimized.

In the preferred embodiment the first lens in the front lens group 21 is made out of BAK50 which is a hard stratch-resistant glass type with good chemical and climatic resistance.

Other glass types or for instance plastic can be used for the lens system, but it should be recognized that this might have an influence on the performance. All the prescribed glass types used in the preferred embodiment of the present invention are available at Schott Glaswerke, Hatterbergstrasse 10, D-6500 Mainz, Germany.

The back lens group 22 is a collective member made out of four elements, one of which is an achromate. As the optical information received by the front lens group 21 is reflected in an angle a of less than 180 degrees by the reflective element 23, the length of the back lens group 22 does not, or only slightly, influence the height b of the body 20. Hence, it is possible to have a plurality of lenses in the back lens group 22 and a large relative aperture and obtain a good sharp image. Furthermore, it is possible to make use of relatively thick lenses and achromates like for example the first lens and the achromate in the back lens group 22.

Figure 6:
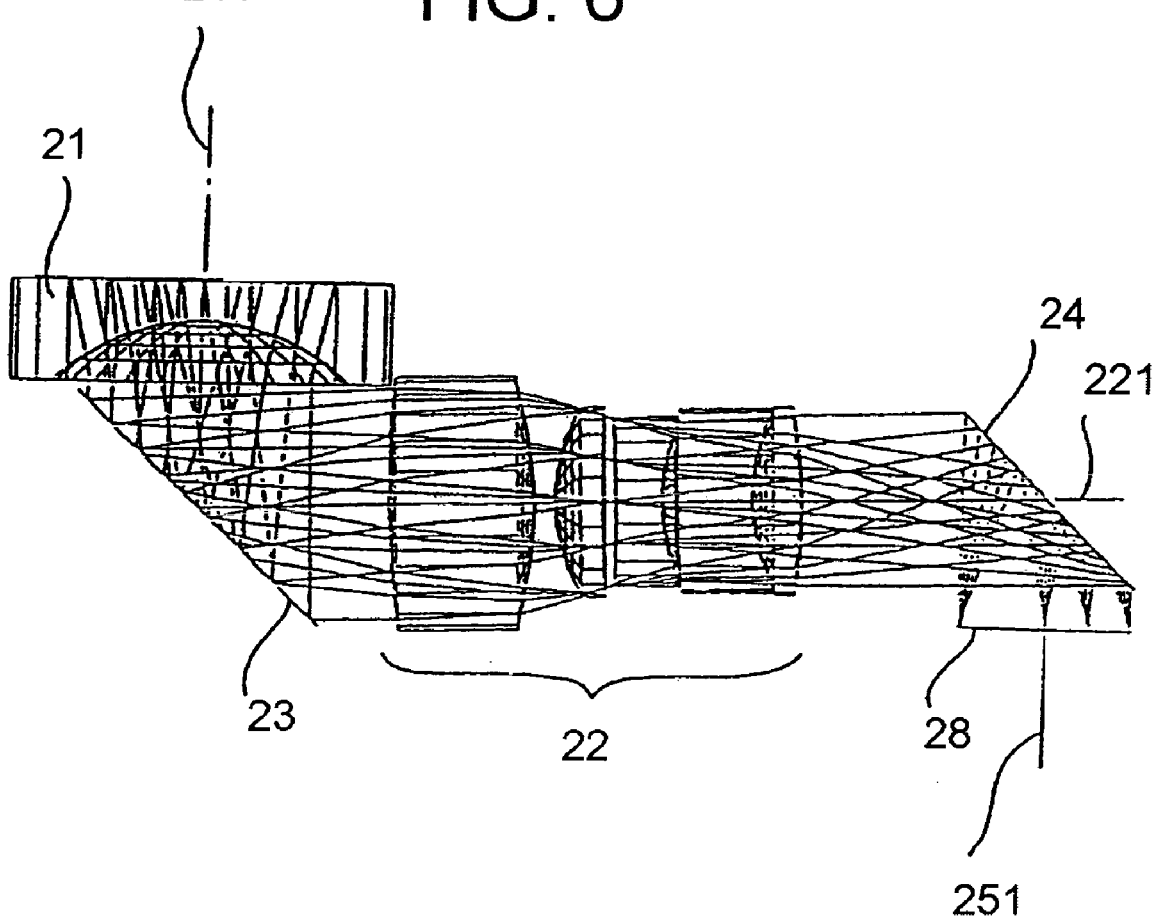
FIG. 6 shows a raytracing of the lens system according to a preferred embodiment of the present invention similar tp that shown in FIG. 2A without the filter 27.

The data of the lens system of the preferred embodiment of the present invention shown in FIG. 6 are shown in Table 1.

TABLE 1

| Surface | Radius | Thickness | Glass | Diameter |
|---|---|---|---|---|
| Object | Infinity | 1031 | | 1268.761 |
| 1 | 69.82798 | 0.62491 | BAK50 | 5.5685 |
| 2 | 3.08561 | 2.79169 | | 4.4154 |
| 3 coordbrk | | 0 | | 0 |
| 4 | Infinity | 0 | Mirror | 5.3371 |
| 5 coordbrk | | −2.79169 | | 0 |
| 6 | −14.03706 | −2.20607 | BAFN6 | 3.7858 |
| 7 | 5.85567 | −0.27864 | | 3.5009 |
| 8 | −2.89064 | −0.67185 | BALF5 | 2.8786 |
| 9 | −20.0553 | −0.05665 | | 2.6079 |
| 10 Stop | Infinity | −0.17353 | | 2.5891 |
| 11 | 16.94942 | −0.62243 | F6 | 2.5588 |
| 12 | −2.89336 | −0.19691 | | 2.4885 |
| 13 | −9.22677 | −1.10781 | SF4 | 2.4885 |
| 14 | −2.99430 | −0.77470 | LAKN7 | 2.6708 |
| 15 | 7.23099 | −3.65 | | 2.8492 |
| 16 coordbrk | | 0 | | 0 |
| 17 | Infinity | 0 | Mirror | 5.1239 |
| 18 coordbrk | | 1.95296 | | 0 |
| Image | Infinity | 0 | | 4.6059 |

Units: mm
Effective focal length f: 3.98
Aperture: F#2.8

The lens system has an S-ratio of 1.2 making it ideal for a "heavy duty" "wallet camera", and through about 13% down scaling it is ideal for an image recording system with a body having a height b that conforms with the PCMCIA type II standard.

A skilled person can select the data and materials of the various lens elements and other components suitable for alternative designs, considering changes in performances.

The reflective elements 23 and 24 are in the preferred embodiment first surface mirrors. They can be replaced by prisms.

In an embodiment with SLR (Single Lens Reflex) function the additional reflective element can be replaced by a beam splitter, dividing the image 28 formed by the lens system into two images: one focusing on the image recording device 25, the other being transformed into a viewer as it is known in the art. In this way a zoom function can be established in a very flat design.

In the preferred embodiment of the present invention, the image recording device 25 is a two-dimensional array CCD (Charge Coupled Device) image sensor. The optical image 28 formed by the lens system is transformed into electrical signals by the image recording device 25. These electrical signals can be processed and stored on a data storing device, typically a semiconductor memory.

Figure 3B:
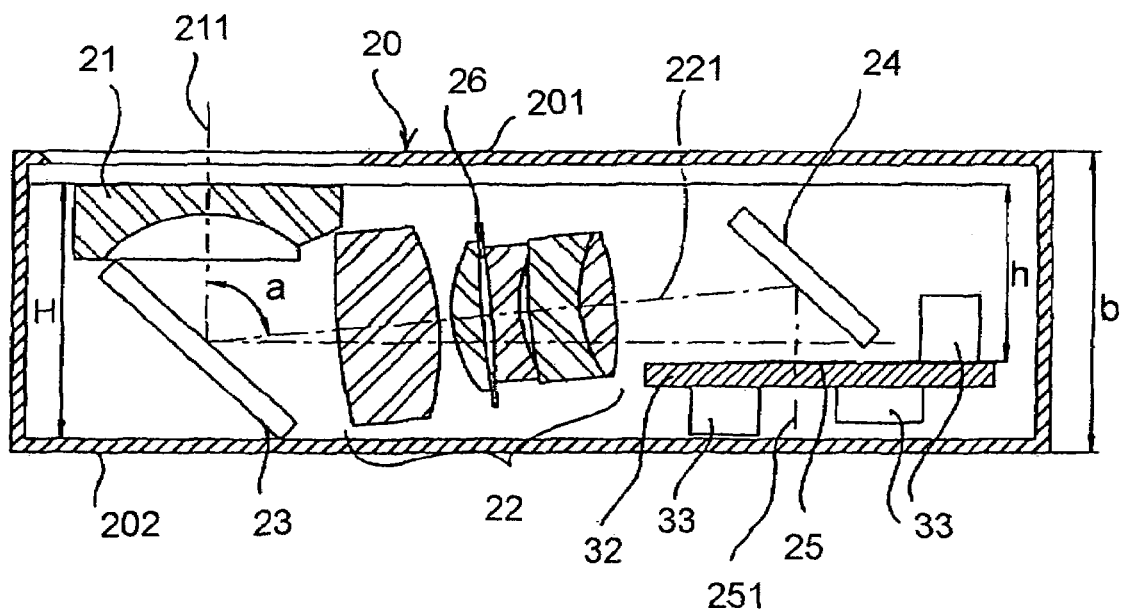

FIGS. 3A and 3B show the lens system and optical image recording device 25 in an embodiment with a non-rotary-symmetrical front lens group element and a decreased angle a. As the active part of the image recording device in the preferred embodiment is rectangular, lenses far from the aperture stop 26 do not need to be rotary-symmetrical. In FIG. 3A this feature is used to decrease the angle a, whereby it is obtained that the effective lens height h of the lens system can be decreased, or that the length of the optical axis 251 from the reflective element 24 to the image recording device 25 can be increased without increasing the effective lens height h. This is important when utilizing a CCD (or other type of optical image recording device) in a housing 31 with walls being in a higher level than the active part of the CCD. This is illustrated in FIG. 3A. By making the effective lens height h considerably smaller than the total height H of the optical system, it is possible to mount the CCD 25 directly on a printed circuit board 32, whereby the electronical part of the optical image recording system can be simplified and made more compact, since only one printed circuit board is required. Further, according to the general principle of "chips on board" technology, components 33 may be positioned on both sides of the printed circuit board 32 without increasing the total height H of the optical system and thereby the height b of the optical image recording system. This is illustrated in FIG. 3B.

Figure 4:
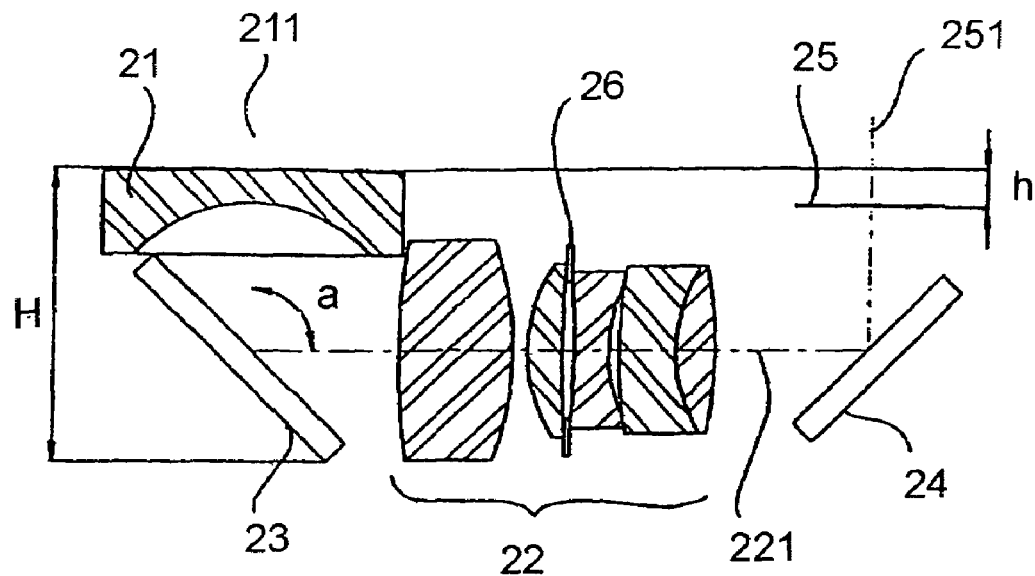

FIG. 4 shows the lens system and image recording device in an embodiment with a U-shaped optical path from the front lens group 21 to the image recording device 25. As in FIGS. 2 and 3 the optical information received by the front lens group 21 is reflected to the back lens group 22 by the reflective element 23. The image formed by the lens system is then reflected by the reflective element 24 to the image recording device 25.

The embodiment shown in FIG. 4 is especially useful in applications where the effective lens height h must be very small, and in applications with more than one lens in the front lens group 21.

When the length of the optical axis 211 from the front point of the first optical element having the optical axis 211 as its optical axis to the reflective element 23 is relatively long (due to a large front lens group), the embodiment shown in FIG. 4 can be used in order to minimize the total height H or in order to make it possible to utilize a CCD in a standard housing. Furthermore, a filter, e.g. a blur filter, can be inserted between the reflective element 24 and the image recording device 25.

Figure 5:
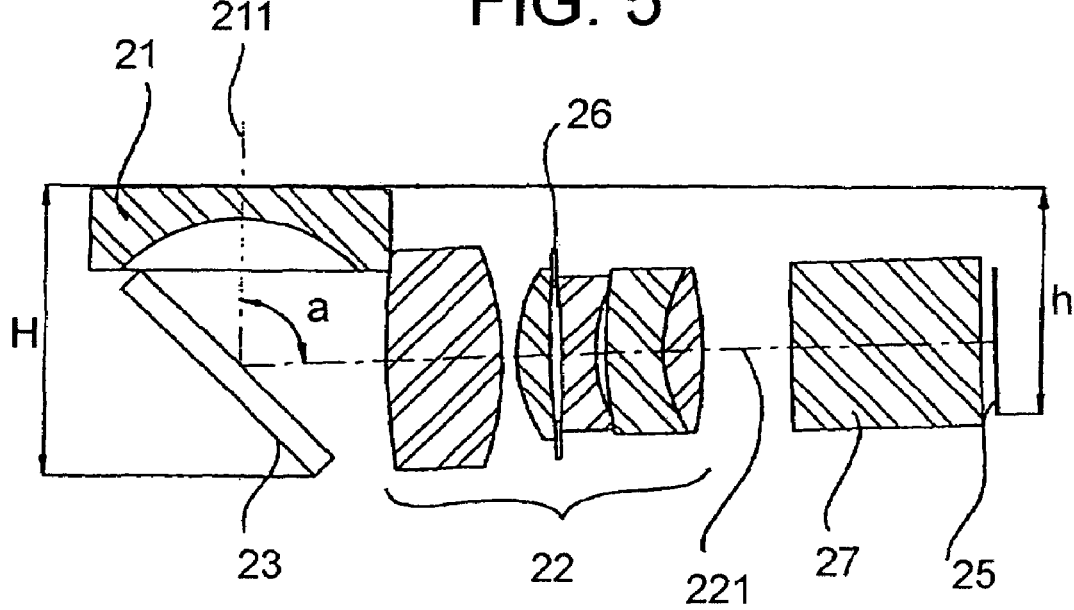

FIG. 5 shows the lens system and image recording device 25 in an embodiment with only one reflective element 23. In this embodiment of the present invention the second reflective element 24 has been left out, whereby the number of components is reduced and the lens system is simplified.

This preferred embodiment of the present invention allows the image recording device 25 to be thick in the direction of the optical axis 221. For applications where a good cooling of the image recording device 25 is desirable, e.g. under low-light conditions requiring a large signal-to-noise ratio, the embodiment shown in FIG. 5 can be used. It provides space on the back of the image recording device 25 for arrangements of one or more cooling devices such as e.g. heat sinks, cooling fans or peltier elements. Because of the long back focus and the omission of the second reflective element 24, the embodiment further provides space for optical filters 27 of a considerable thickness between the last lens in the back lens group 22 and the optical image recording device 25. Depending on the image recording device 25, a birefringent blur filter will usually provide a better image quality. This embodiment of the present invention provides space for a multiple plate birefringent blur filter for improved image quality. Due to a choice of the folding angle a, the distance in the direction of the optical axis 211 from the outer surface 201 of the body 20 to the center of the image recording device 25 can be chosen to be close to half the body height b of the body 20. In this way the image recording device 25 can utilize the total available height inside the body 20 and hence the size of the image recording device 25 can be maximized, whereby optimum resolution and sensitivity is ensured.

FIG. 6 shows a raytracing of the lens system according to a preferred embodiment of the present invention. The raytracing is shown with the optical axis 211, 221 and 251 in the paper plane and an aperture F#: 2.8.

Figure 7:
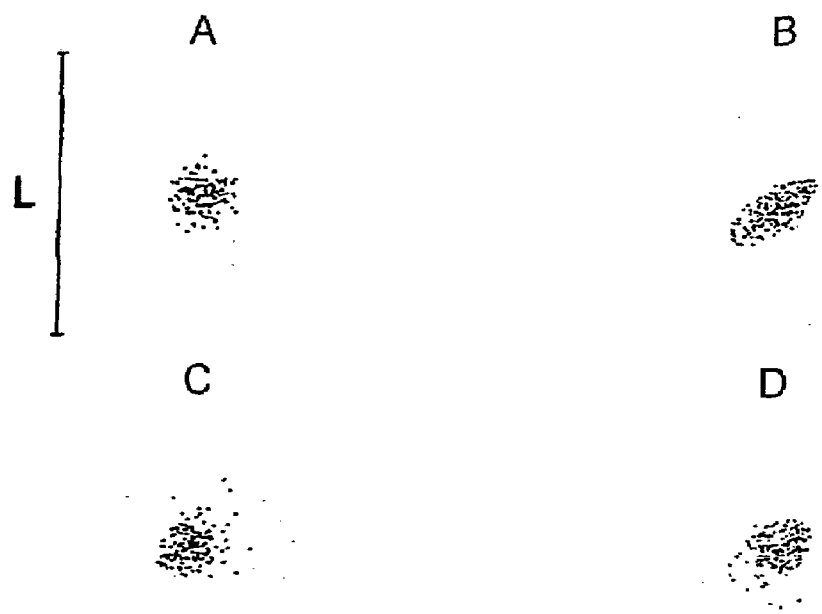
FIG. 7 shows a spot diagram of the lens system of the preferred embodiment shown in FIG. 6.

FIG. 7 shows a spot diagram of the lens system of the preferred embodiment shown in FIG. 6. Four fields are shown: A, B, C and D. The data for the four fields are as shown in Table 2.

TABLE 2

| Field | A | B | C | D |
| --- | --- | --- | --- | --- |
| Object | 0.00 | 13.09 | 26.18 | −26.18 |
| (deg.) | 0.00 | 10.06 | 20.12 | −20.12 |
| Image (mm) | 0.00 | 0.90 | 1.76 | −1.76 |
|  | 0.00 | 0.69 | 1.31 | −1.31 |
| RMS radius (micron) | 1.268 | 1.815 | 1.462 | 1.454 |
| Geometrical radius (micron) | 2.934 | 4.676 | 5.182 | 4.066 |

Reference: Chief ray.
The length L of the scale bar is 20 micron.

The RMS radius is the root mean square radius of the spot. No diffraction is considered in these calculations. The analysis has been made by using the optical design program Zemax v.2.8 and v.4.0 from Focus Software Inc., P.O.Box 18228, Tucson, Ariz. 85731, USA.

Figure 8:
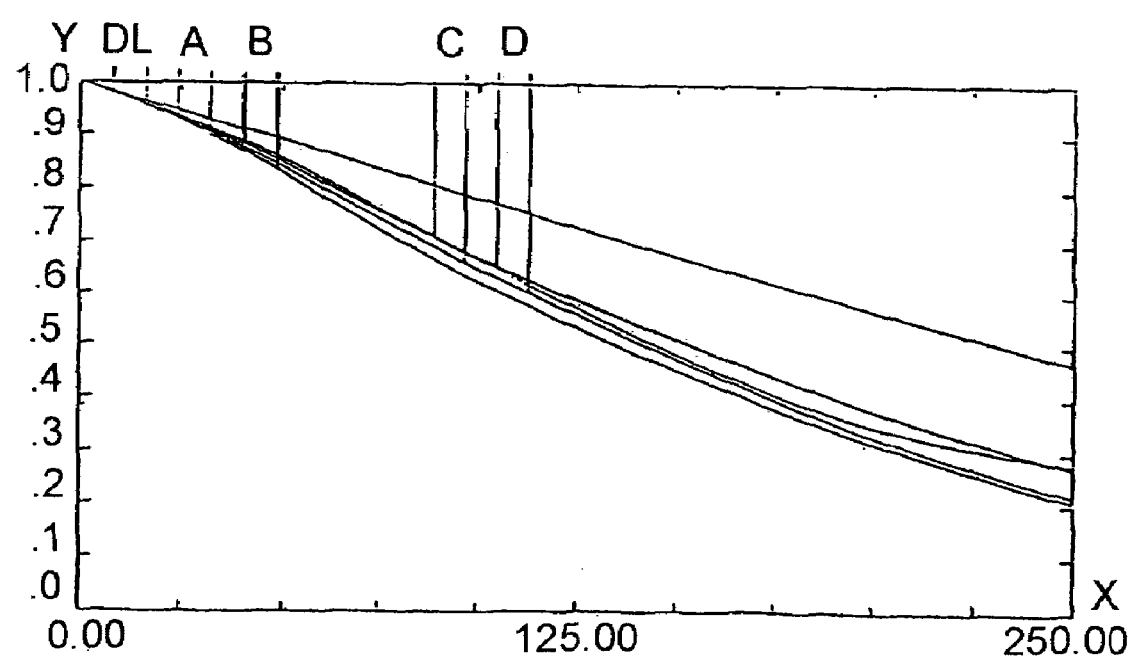
FIG. 8 shows a polychromatic diffraction modulation transfer function (MTF) for the lens system of the preferred embodiment shown in FIG. 6.

FIG. 8 shows a polychromatic diffraction modulation transfer function (MTF) for the lens system of the preferred embodiment shown in FIG. 6 and at full aperture. The MTF is shown for four fields: A, B, C and D. The fields are the same as in FIG. 7. DL is the diffraction limit. The Y-axis is the contrast of an image of a sinusoidal grating object. The X-axis is the spatial frequency in cycles per millimeter in the imaged grating.

Figure 9:
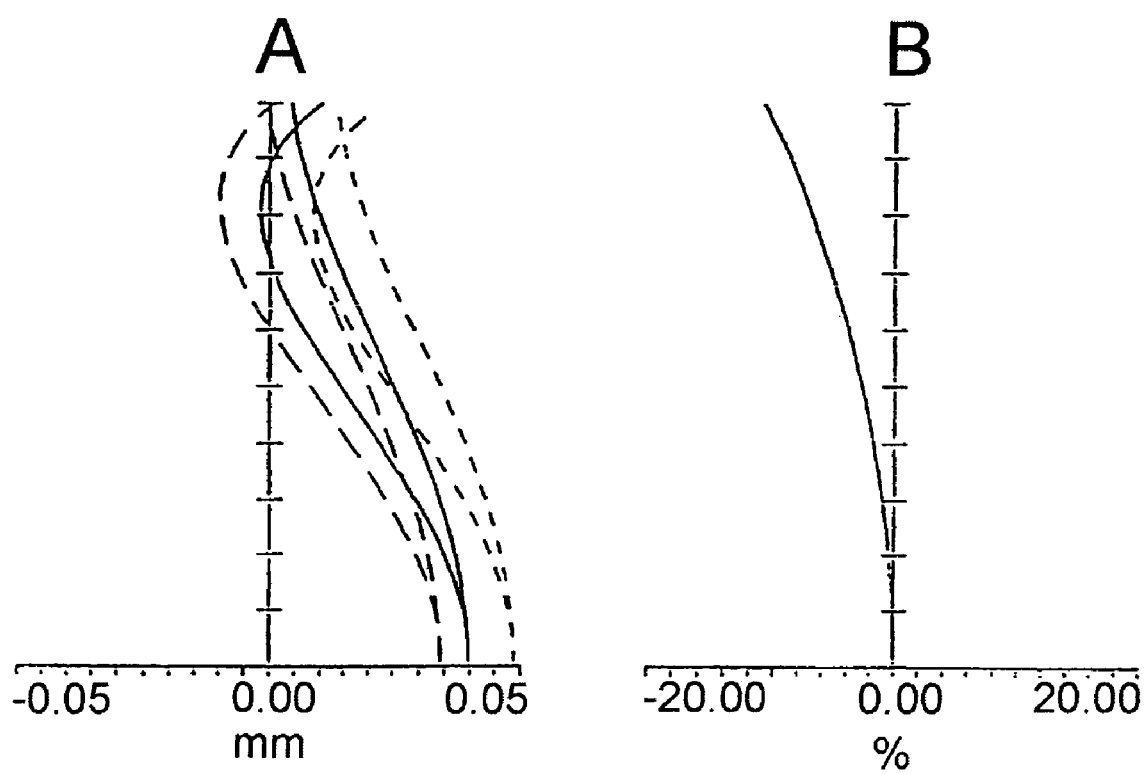
FIG. 9 shows the field curvature (A) and geometrical distortion (B) of the lens system of the preferred embodiment shown in FIG. 6.

FIG. 9 shows the field curvature (A) and geometrical distortion (B) of the lens system of the preferred embodiment shown in FIG. 6. The field curvature plot shows the distance from the actual image plane to the paraxial image plane as a function of the field angle. The X-axis is the field curvature in millimeters. Full Y-axis equals 63 degree full field of view. Tangential (T) and Sagittal (S) focal lines are shown for three different wavelengths: 0.486 microns, 0.588 microns and 0.656 microns.

For the geometrical distortion a full Y-axis equals 63 degree full field of view. The units on the X-axis is in percent.

FIGS. 10A, 10B, and 10C show three views of a preferred embodiment of an image recording system according to the present invention. In this preferred embodiment the body 20 is card-shaped, whereby it can be kept in a wallet or a small handbag for carrying credit cards. Furthermore it comprises a connector device 1001 having connector pins 1003, and the body 20 is provided with means of guidance 1004, whereby it is possible to insert and connect the optical image recording system in the slot of an image processing system. The optical information is received and formed into an image by the lens system as described for the embodiment shown in FIGS. 2A and 2B. The image recording device 25 transforms the optical information into electrical information which is stored in the solid state memory 1002. In the preferred embodiment this memory is demountable and replaceable. The solid state memory is a flash memory as it is known in the art. Other kinds of memory devices can be used as well. The broad surfaces 201 and 202 makes it possible to use one or more PCB's (Printed Circuit Boards) for the mounting of the electronical circuits and components necessary for controlling the image recording device 25 and for processing the electrical information from the image recording device 25. Furthermore, the broad surfaces 201 and 202 make it possible to provide the optical image recording system with an effective and "easy to use" viewer 1006 for pointing out the object to be recorded. The optical image recording system also comprises a shutter 1007 for activating the image recording system. By the use of polarization keys 1005 it is obtained that the image recording system is not reversed when inserted into an image processing system. The polarization keys also make it possible to ensure that the image recording system can only be inserted into image processing systems and chargers having the correct voltage and pin configuration. The means of guidance 1004 helps inserting the image recording system in the mating image processing system, charger or the like. It also means that the body 20 can have many various designs, sizes and shapes and can still easily be inserted into the mating unit. In this way it is possible to add or subtract features and obtain a flexible design platform within the same "frame" provided by the means of guidance 1004. The connector pins 1003 of the connector device 1001 are housed inside the connector device 1001. They are hereby protected from mechanical and electrical stress such as electro-static discharge that can otherwise damage the sensible electronics inside the optical image recording system.

Figure 11:
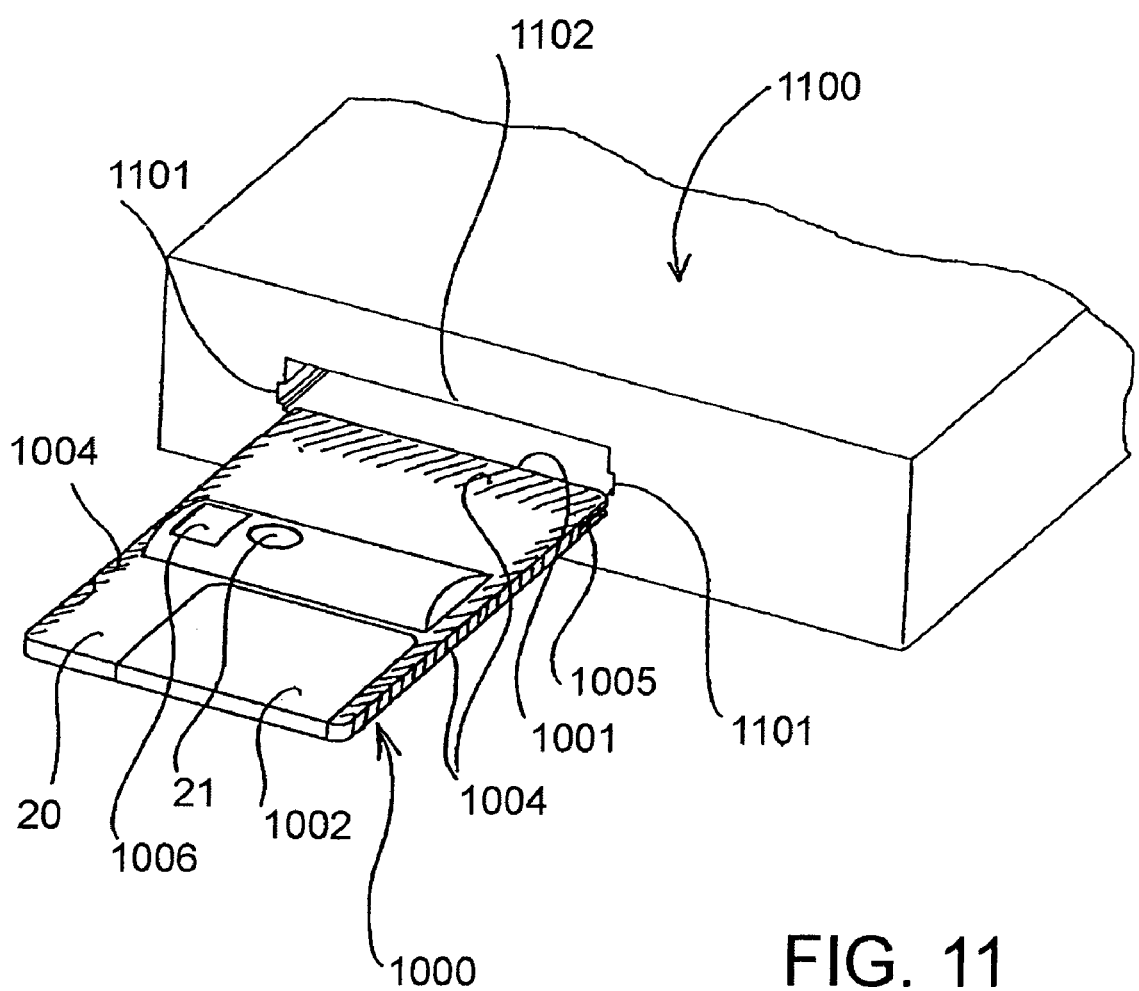
FIG. 11 shows a preferred embodiment of the optical image recording system non-inserted into an image processing system.

FIG. 11 shows the optical image recording system 1000 non-inserted into the image processing system 1100. The means of guidance 1004 (the hatched parts) of the image recording system 1000 mates the means of guidance 1101 of the image processing system 1100 and ensures a safe and easy connection of the two systems.

Figure 12:
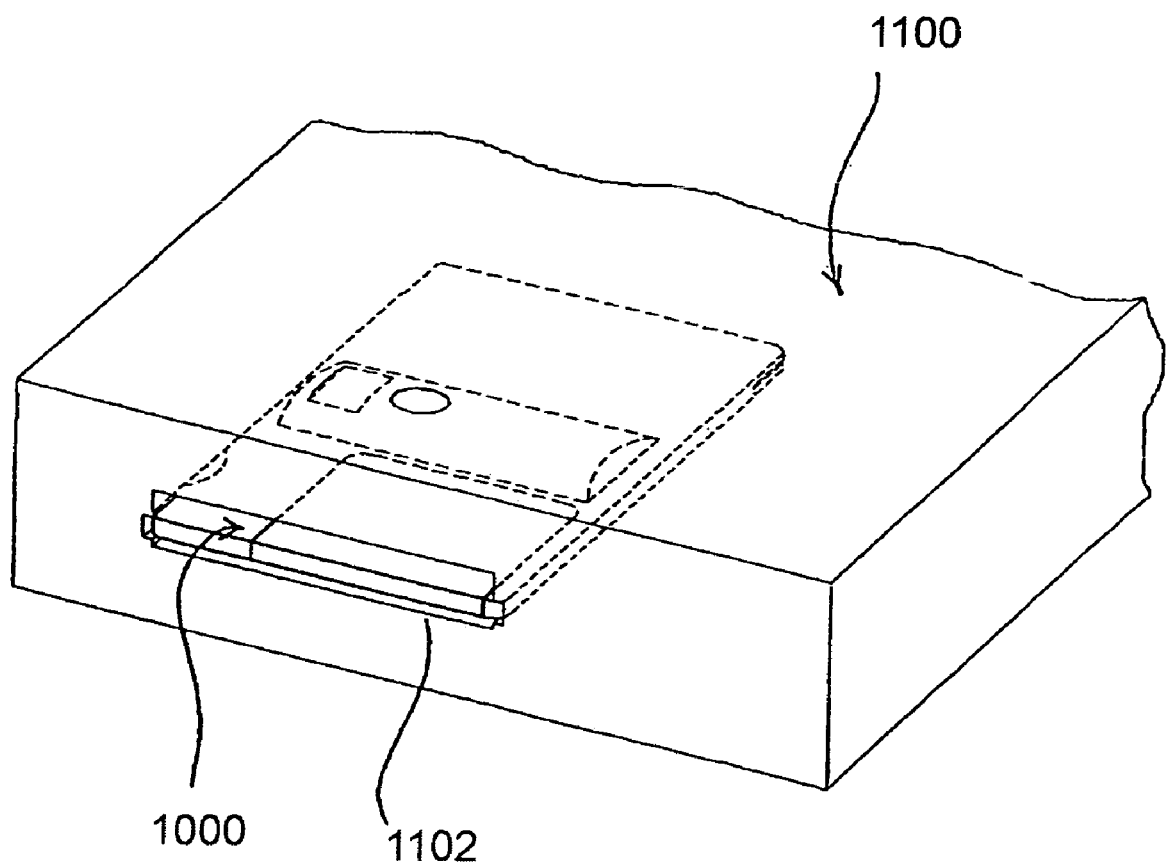
FIG. 12 shows the preferred embodiment shown in FIG. 11 inserted into the image processing system also shown in FIG. 11.

FIG. 12 shows the optical image recording system 1000 inserted into the image processing system 1100. When the two systems are connected, they appear in the preferred embodiment of the present invention as one single unit.

Figure 13B:
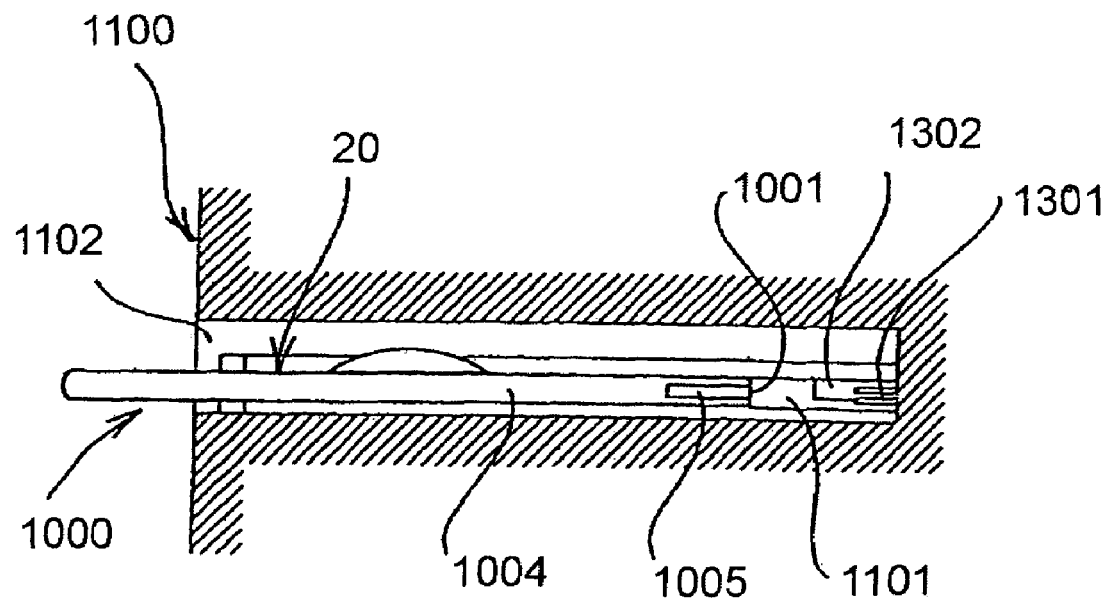
FIGS. 13A and 13B show a cross-sectional view, of a preferred embodiment of the image recording system partly and completely inserted into an image processing system.
Figure 13A:
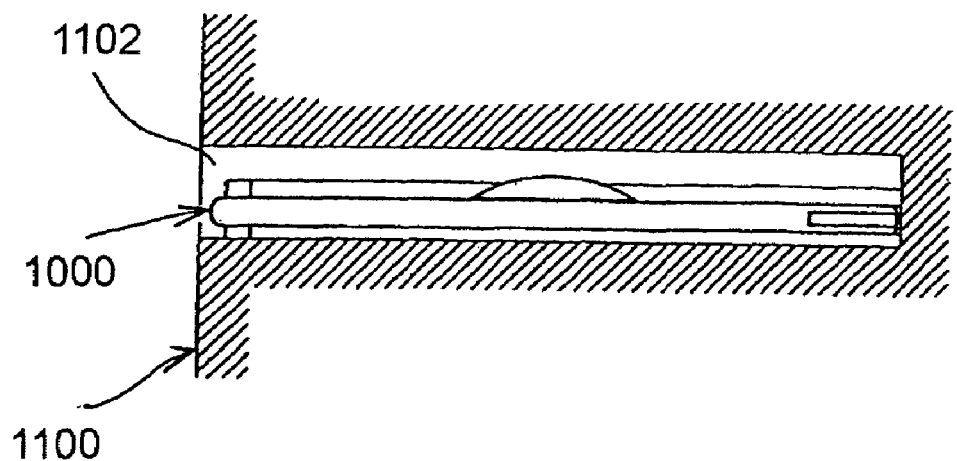

FIGS. 13A and 13B show a cross-sectional view of a preferred embodiment of the image recording device 1000 partly and completely inserted into the image processing system 1100. The image processing system 1100 comprises a connector 1301 and polarization keys 1302 mating the connector 1001 and the polarization keys 1005 of the image recording system 1000.

FIGS. 14A, 14B, 14C, and 14D show a preferred embodiment of the means of guidance 1004 of the image recording system according to the present invention. The hatched parts on the body 20 are the preferred embodiment of the means of guidance 1004. It stretches all along the side of the body 20 whereby a good guidance in the total length of the body 20 of the image recording system is obtained. Furthermore, especially around the connector device 1001, a good guidance is obtained. In this way it is possible in the preferred embodiment to utilize small and fragile connector pins in the connector devices 1001 and 1301. Hence a large number of connector pins can be used and a fast parallel data bus can be formed.

Figure 15:
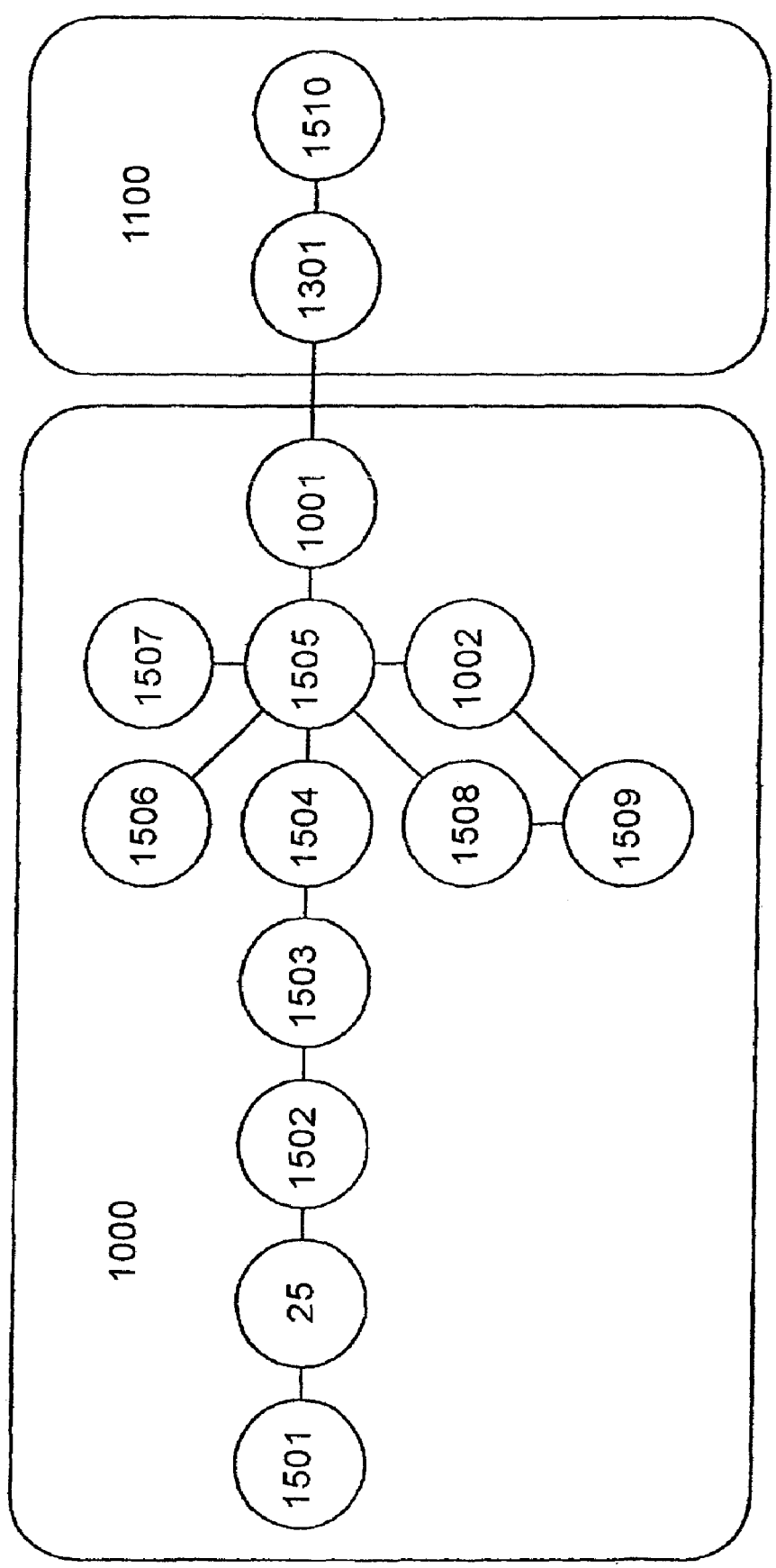
FIG. 15 shows a block-diagramme of an embodiment of the image recording system and its connection to an image processing system.

FIG. 15 shows a block-diagram of an embodiment of the image recording device and its connection to an image processing system. The optical information is received through the lens 1501 and formed into an image recorded by the image recording device 25. The electrical information is then passed on to a CCD drive section 1502 and a signal processing section 1503, as it is known in the art. The output signal is transformed to digital form via an A/D (Analog/Digital) converter 1504. The databus 1505 exchanges information between each section of the image recording system. Image processing software for the image processing system 1100 is stored in the memory 1506 and can be transferred to the image processing system 1100 when the image recording system 1000 is connected thereto either by wire or wireless. In this way it is obtained that data from the image recording system can be processed on any image processing system, provided the image processing system comprises a mating connector device and/or a receiver/transmitter device and an operating system capable of operating the software provided by the image recording system.

Further, signal processing and correction of geometrical distortion introduced by the lens system 1501 can be done in the processing block 1508, whereafter the data are compressed in the data compressor 1509. The data can then be stored in the memory 1002. An optional buffer memory 1507 ensures that data from the A/D converter 1504 can be temporarily stored before they are processed in 1508 and data compressed in 1509.

Data stored in the memory 1002 can be transferred to the image processing system 1100 via the databus controller 1505 and the connector devices 1001 and 1301. The data are processed in the image and data processing device 1510.

Hence processing including correction of geometrical distortion does not have to take place in the image recording system 1000, but can very well be done in the image processing system 1100.

The structure of the image recording system and the image processing system can be altered and designed differently from what is known in the art, just as a beam-splitting prism can be inserted between the lens 1501 and the image recording device 25, whereby three separate imagers R (Red), G (Green) and B (Blue) can be used.

The invention claimed is:

1. A lens system comprising:
   a front lens group having a first optical axis;
   a back lens group having a second optical axis,
      wherein a lens in the back lens group, which is closest to the front lens group, is positioned at the cut off portion of front lens group,
      wherein the first optical axis is substantially parallel with a height direction of the lens system,
      wherein the second optical axis is substantially parallel with a length direction of the lens system so that a plurality of lenses are included in the back lens group without increasing the height of the lens system, and
      wherein the back lens group includes an aperture stop having surface substantially perpendicular with the second optical axis;
   a reflective element folding said first optical axis into said second optical axis in an angle of less than 180 degrees;
      wherein at least one lens adjacent to said reflective element is a non-rotary symmetrical lens.

2. The system according to claim 1, wherein the lens system comprises an additional reflective element folding the second optical axis into an optical axis of an image recording device.

3. The system according to claim 1, wherein the first optical axis and the second optical axis form an angle equal to or less than 90 degrees.

4. The system according to claim 1, wherein the second optical axis and an optical axis of an image recording device form an angle equal to or less than 90 degrees.

5. The system according to claim 1, wherein an image recording device is a charge coupled device.

6. The system according to claim 1, wherein the lens system has a ratio of an optical system height divided by a diameter of a circumferential circle of a formed image less than 4.

7. The system according to claim 1, wherein a height ratio of an effective lens height and an effective focal length of the lens system is less than 1.7.

8. The system according to claim 1, wherein a height of a body is less than 20 mm.

9. The system according to claim 1, wherein the front lens group and the reflective element consist of a prism.

10. The system according to claim 1, wherein an additional reflective element consist of a prism.

11. The system according to claim 1, further comprising a body further comprising means for storing, transferring and receiving electronic signals of optical information and other information to and from an external device.

12. The system according to claim 11, wherein the means for transferring and receiving electronic signals comprise a connector device having a databus interface.

13. The system according to claim 12, wherein the connector device is accommodated in an end face of said body.

14. The system according to claim 11, wherein the storage means for storing the electronic signals consist of an exchangeable memory.

15. The system according to claim 11, wherein the means for transferring electronic signals comprise a wireless transmitter of analogue and/or digital transmission.

16. The system according to claim 11, wherein the means for receiving electronic signals comprises a wireless receiver of analog and/or digital transmission.

17. The system according to claim 1, wherein a body further comprises means for storing electronic signals of control information for controlling the operation of an external device.

18. The system according to claim 17, which comprises means for loading the control information into the external device.

19. The system according to claim 1, wherein a body further comprises guiding means.

20. An optical image recording system for electric recording of optical information, the optical image recording system comprising:
a lens system and a body; and
wherein the lens system comprises:
a front lens group having a first optical axis;
a back lens group having a second optical axis,
wherein a lens in the back lens group, which is closest to the front lens group, is positioned at the cut off portion of front lens group,
wherein the first optical axis is substantially parallel with a height direction of the lens system,
wherein the second optical axis is substantially parallel with a length direction of the lens system so that a plurality of lenses are included in the back lens group without increasing the height of the lens system, and
wherein the back lens group includes an aperture stop having surface substantially perpendicular with the second optical axis;
a reflective element folding said first optical axis into said second optical axis in an angle of less than 180 degrees;
wherein at least one lens adjacent to said reflective element is a non-rotary symmetrical lens.

21. The system according to claim 20, wherein the lens system comprises an additional reflective element folding the second optical axis into the optical axis of an image recording device.

22. The system according to claim 21, wherein said body further comprises guiding means.

23. The system according to claim 20, wherein the first optical axis and the second optical axis form an angle equal to or less than 90 degrees.

24. The system according to claim 20, wherein the second optical axis and an optical axis of an image recording device form an angle equal to or less than 90 degrees.

25. The system according to claim 20, wherein an image recording device is a charge coupled device.

26. The system according to claim 20, wherein the lens system has a ratio of an optical system height divided by the diameter of the circumferential circle of the formed image less than 4.

27. The system according to claim 20, wherein a height ratio of the effective lens height and the effective focal length of the lens system is less than 1.7.

28. The system according to claim 20, wherein the height of said body is less than 20 mm.

29. The system according to claim 20, wherein the front lens group and the reflective element consist of a prism.

30. The system according to claim 20, wherein an additional reflective element consists of a prism.

31. The system according to claim 20, wherein said body further comprises means for storing, transferring and receiving electronic signals of optical information and other information to and from an external device.

32. The system according to claim 31, wherein the means for receiving electronic signals comprises a wireless receiver of analog and/or digital transmission.

33. The system according to claim 31, wherein the means for transferring electronic signals comprise a wireless transmitter of analogue and/or digital transmission.

34. The system according to claim 31, wherein the storage means for storing the electronic signals consist of an exchangeable memory.

35. The system according to claim 31, wherein the means for transferring and receiving electronic signals comprise a connector device having a databus interface.

36. The system according to claim 35, wherein the connector device is accommodated in an end face of said body.

37. The system according to claim 20, wherein the body further comprises means for storing electronic signals of control information for controlling the operation of the external device.

38. The system according to claim 37, which further comprises means for loading the control information into the external device.

* * * * *